US012696095B2

(12) United States Patent
Robinson Hodges et al.

(10) Patent No.: US 12,696,095 B2
(45) Date of Patent: Jul. 28, 2026

(54) DETECTING FRAUDULENT SIM CARD ACTIVITY WHILE ROAMING OUTSIDE A TELECOMMUNICATIONS NETWORK

(71) Applicant: Microsoft Technology Licensing, LLC, Redmond, WA (US)

(72) Inventors: Andrew John Robinson Hodges, Enfield (GB); Edmund Richard James Pringle, London (GB); Keith Stuart Wansbrough, Brightons (GB); Martin George Davidson, Edinburgh (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 18/744,041

(22) Filed: Jun. 14, 2024

(65) Prior Publication Data

US 2025/0386196 A1 Dec. 18, 2025

(51) Int. Cl.
*H04L 29/00* (2006.01)
*H04W 12/126* (2021.01)
*H04W 12/72* (2021.01)
(52) U.S. Cl.
CPC ......... *H04W 12/126* (2021.01); *H04W 12/72* (2021.01)
(58) Field of Classification Search
CPC ............................ H04W 12/126; H04W 12/72

USPC ........................................................... 726/23
See application file for complete search history.

(56) References Cited

U.S. PATENT DOCUMENTS

| 11,902,786 B1 * | 2/2024 | Sharma | .................. H04W 12/35 |
| 2013/0205390 A1 * | 8/2013 | Hauck | ................... H04W 8/205 |
| | | | 726/22 |
| 2023/0216967 A1 * | 7/2023 | Murali | .................. H04M 15/41 |
| | | | 455/406 |

* cited by examiner

*Primary Examiner* — Brandon Hoffman
*Assistant Examiner* — Michael D Anderson
(74) *Attorney, Agent, or Firm* — Ray Quinney & Nebeker P.C.; James S. Bullough

(57) ABSTRACT

The present disclosure generally relates to predicting and remediating fraudulent activity associated with a roaming SIM card. Systems described herein involve detecting potential fraud signals associated with a roaming SIM card and applying one or more machine learning models to those signals to generate a fraud prediction. In one or more examples, the potential fraud signals are detected in connection with one or more core network components of a 5G telecommunication network and provide unique insight into the network activities of a user equipment where the roaming SIM card is installed. As such, the systems described herein generate fraud predictions that take into account signals that are not necessarily indicative of fraud by themselves. Once fraud is predicted, the systems described herein execute various remediation actions to correct the fraudulent activities.

19 Claims, 4 Drawing Sheets

DETECTING FRAUDULENT SIM CARD ACTIVITY WHILE ROAMING OUTSIDE A TELECOMMUNICATIONS NETWORK

FIELD OF TECHNOLOGY

This disclosure relates to detecting fraudulent SIM card activity while roaming outside a telecommunications network.

BACKGROUND

Cellular networks can provide computing devices (e.g., mobile devices) with access to services available from one or more data networks. A cellular network is typically distributed over geographical areas that include one or more base stations and core network devices that provide a cell with network coverage. The devices of the cellular network provide reliable access to a data network by mobile devices over a wide geographic area. In many instances these cellular networks provide mobile devices access to the cloud.

As noted above, cellular networks include a number of network components. For example, cellular networks often include a radio access network (RAN) and a core network. The RAN may include base stations that communicate wirelessly with user devices (e.g., mobile devices) and facilitate interaction with components of a core network. The core network may provide access to services and data available from one or more external networks. As noted above, cellular networks are often used to provide Internet connectivity to mobile devices.

To access such cellular networks, mobile devices generally utilize Subscriber Identity Module cards or SIM cards. For example, a SIM card is a small card that inserts into a mobile device and includes identification and authentication information that allows the mobile device to communicate with a carrier network. In most examples, a SIM card contains a unique identification number that is associated with information about a network plan, such as a phone number, available data, voice minutes, and text messages. During network registration of the mobile device, a carrier network utilizes SIM card data to verify account status and determine the appropriate charges and fees for network usage. In many examples, an eSIM card performs the same functions in a mobile device.

SIM cards and eSIM cards allow for a mobile device to connect to a carrier network when the mobile device is located both within the carrier network's coverage areas and outside the carrier network's coverage areas (e.g., roaming). When a mobile device is roaming, it connects to a network outside of the carrier network associated with the mobile device's SIM card. This outside network communicates the connection to the correct carrier network eventually, but there is a window of time before the usage data in the account associated with the SIM card is synchronized to the carrier network. This window of time can be exploited by bad actors to engage in fraudulent activities. It is often difficult to detect and remediate this type of fraudulent activity.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

DETAILED DESCRIPTION

Figure 1:
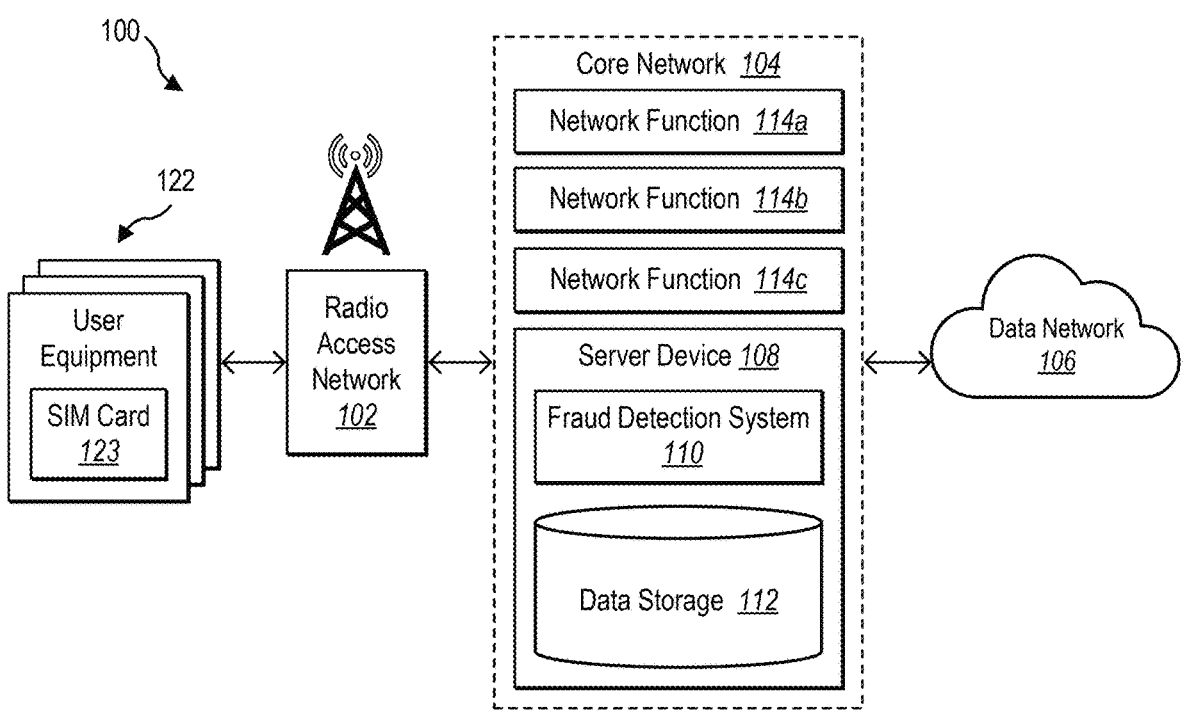
FIG. 1 illustrates an example telecommunications network environment including a fraud detection system implemented within a core network.

The present disclosure relates to systems, methods, and computer-readable media for detecting and remediating fraudulent SIM card activity while roaming outside of a telecommunications network. For example, and as will be discussed in greater detail below, the systems, methods, and computer-readable media discussed herein include a fraud detection system that leverages potential fraud signals associated with a SIM card to determine whether or not the SIM card is engaging in fraudulent activity. In one or more implementations, the systems, methods, and computer-readable media then apply one or more machine learning models to the potential fraud signals to generate a fraudulent activity prediction associated with the SIM card. In at least one implementation, the systems, methods, and computer-readable media execute one or more remediation actions associated with the SIM card to address the predicted fraudulent activity.

As an illustrative example, a telecommunication network provisions SIM cards for user equipments such as mobile devices. When a mobile device with such a SIM card is powered on, the SIM card provides identifying information such that the mobile device can connect to a nearest access point (e.g., a cell-phone tower) within the telecommunication network. Sometimes, a mobile device will be geographically located outside of the telecommunication network's area of coverage-such as when the user of the mobile device is traveling to a different country.

In that case, the mobile device will utilize the SIM card data to connect to whatever network is available as a roaming subscriber. The SIM card data allows for the activity patterns of the mobile device to eventually be accounted for correctly on the telecommunication network that originally provisioned the SIM card. Due to latency and other communication delays, however, this accounting does not happen in real-time. As such, there is a window of time between the mobile device connecting as a roaming subscriber and the activity accounting on the original telecommunication network when fraudulent SIM card activity can occur.

To predict and remediate this fraudulent SIM card activity, a fraud detection system described herein leverages subscriber data produced by subscriber data management functions within a core network of the telecommunication system. For example, the fraud detection system described herein can identify and utilize information specific to a particular network session to detect whether an associated mobile device is roaming, where the mobile device is located currently, where the mobile device was located upon registration, a duration of network activity associated with the mobile device, and so forth. In one or more implementations, the fraud detection system described herein then applies one or more machine learning models to the combinations of these signals to generate a fraud prediction associated with the SIM card installed on the mobile device. If fraud is predicted, the fraud detection system can execute one or more remediation actions—such as blocking the SIM card or adding the mobile device to a fraud watch list—to prevent further fraud from occurring in connection with that SIM card.

As will be discussed herein, the present disclosure includes a number of practical applications having features described herein that provide benefits and/or solve problems associated with fraudulent SIM card activity. It will be appreciated that benefits discussed herein are provided by way of example and are not intended to be an exhaustive list of all possible benefits of the management system(s) described herein.

In one or more implementations, the fraud detection system—as part of a core network of a 5G mobile communication network—enables improved network resource efficiency in multiple ways. For example, fraudulent SIM card activity typically occurs during a window of time in between a mobile device registering as a roaming subscriber on a remote telecommunication network and the network activity of the mobile device being accounted for on the original telecommunication network associated with the SIM card installed on the mobile device. As such, bad actors tend to engage in a high volume of network activity during that window of time in an effort to maximize their return. Thus, fraudulent SIM card activity tends to utilize high amounts of network bandwidth and cause spikes in network resource usage. By predicting and remediating this high level of network usage, the fraud detection system removes these spikes in network usage thereby making the network more efficient for legitimate activity.

Additionally, the fraud detecting system eliminates the computing resource waste associated with these spikes in network resource usage. For example, because fraudulent SIM card activity tends to include a high number of network transactions in a short amount of time, network resources are put under a heavier burden to service these transactions quickly. By eliminating these fraudulent network transactions, the fraud detection system reduces this strain and allows the same resources to be utilized more efficiently in connection with legitimate activities.

In addition to the computational efficiencies created by the fraud detection system, the fraud detection system also eliminates other waste generated by SIM card fraud. For example, bad actors engage in fraudulent SIM card activity to make fraudulent online purchases, steal personal information, intercept communications, and otherwise perform illegal activities. Some estimate that this type of fraudulent activity results in billions of dollars in lost revenue every year. As such, the fraud detection system reduces the lost revenue associated with fraudulent SIM card activity across multiple sectors.

As illustrated in the foregoing discussion and as will be discussed in further detail herein, the present disclosure utilizes a variety of terms to describe features and advantages of methods and systems described herein. Some of these terms will be discussed in further detail below.

As used herein, a "telecommunication network" refers to a group of interconnected nodes that facilitate the exchange of messages and signals. In one or more implementations, a telecommunications network includes nodes such as server devices that are connected by links (i.e., wired or wireless). Often, a telecommunications network includes sophisticated routing systems that move messages and signals among the nodes of the network. In one or more implementations, a telecommunication network as discussed herein includes a fifth generation (5G) mobile communication network.

As used herein, a "core network" refers to a backbone of nodes within a larger telecommunications network that is generally considered to be the most crucial part of the telecommunications network. Generally, a core network can include multiple layers. For example, a core network may include an access layer that connects user equipments with the telecommunications network, a distribution layer that connects the access layer with a core layer by providing routing and traffic management, and the core layer that handles connectivity and user services.

As used herein, "fraud" or "fraudulent activity" refers to an intentionally deceptive action designed to provide a bad actor with unlawful gain. There are many types of fraud. Fraudulent activity that takes place within a telecommunication network generally includes credit card fraud, wire fraud (e.g., schemes conducted via email, text messages, or phone calls), and identity fraud. Bad actors in fraudulent activities can include individuals or even groups of people. Moreover, a bad actor can leverage programmatic means (e.g., computer software) to automatically perform their fraudulent activities.

As used herein, "potential fraud signals" refer to data items that are utilized to generate fraud predictions associated with a particular SIM card. As will be discussed in greater detail below, potential fraud signals may not indicate any type of fraudulent activity when taken alone. In combination with other signals, however, these same potential fraud signals may be indicative of fraudulent activity. Potential fraud signals can be specific to a SIM card (e.g., a batch number associated with the SIM card) or may be specific to network activities undertaken by a mobile device once the SIM has been used to register that mobile device with a telecommunication network. As such, potential fraud signals may be detected from the SIM card, from the mobile device where the SIM card is installed, and from other subscriber data modules within the telecommunication network that monitor subscriber data (e.g., geographic data, timing data, activity data, etc.).

As used herein, a "machine learning model" refers to an object that is trained to recognize certain types of patterns and make predictions based on those patterns. Typically, machine learning models are trained with ground truth data. When applied to a new and unknown input, the machine learning model makes a prediction based on this training. As such, machine learning models are appropriately applied to decision tasks, classification tasks, labeling tasks, and more.

As used herein, "remediation actions" refer to actions taken by the fraud detection system to stop and/or correct fraudulent activity associated with a roaming SIM card. In some embodiments, the remediation actions taken by the fraud detection system can scale according to the severity of the predicted fraud. Moreover, in some embodiments, the remediation actions may be configurable such that the remediation actions can change over time according to policies and/or other considerations.

Additional details will now be provided regarding systems described herein in relation to illustrative figures portraying example implementations. For example, FIG. 1 illustrates an example environment 100 for implementing features and functionality of a fraud detection system 110 implemented on a network device (e.g., a server device 108) within a core network 104 of a telecommunications network. As shown in FIG. 1, the environment 100 includes a radio access network 102 (RAN), the core network 104, and a data network 106. It will be appreciated that one or more features of the RAN 102, core network 104, and data network 106 may be implemented in whole or at least partially on a cloud computing system. For example, in one or more embodiments, portions of the RAN 102 may be virtualized on server nodes of the cloud computing system while some or all of the core network components may be implemented on server nodes of the cloud computing system.

As shown in FIG. 1, the server device 108 can include the fraud detection system 110 and a data storage 112. Moreover, the core network 104 can include a number of network functions 114a, 114b, and 114c. A number of additional network functions may be implemented across the network functions 114a-114c within the core network 104. For example, additional network functions may include policy control functions, charging functions, user plane functions, and so forth. Each of the respective functions may be implemented on or across multiple server nodes. As such, each of the network functions 114a-114c may include an authentication server function (AUSF), a unified data management (UDM) function, and/or a user data repository (UDR) function. In at least one implementation, the network functions 114a-114c may be accessed via a session management function (SMF) on any or all of the server device 108, and/or the network functions 114a-114c. Additionally, any of the network functions 114a-114c may include virtual machines, containers, and/or other computer programs. The network functions 114a-114c may be located on separate servers or on the same server.

As shown in FIG. 1, the environment 100 may include a number of user equipments (UEs) 122. The UEs 122 may refer to a variety of computing devices or endpoints including, by way of example, a mobile device such as a mobile telephone, a smartphone, a personal digital assistant (PDA), a tablet, or a laptop. One or more of the UEs 122 may refer to non-mobile devices such as a desktop computer, a server device, or other non-portable devices that communicate with other endpoint devices via the telecommunications network. In one or more embodiments, the UEs 122 may refer to applications or software constructs on a computing device. Each of the devices of the environment 100 may include features and functionality described generally below in connection with FIG. 5.

As further shown in FIG. 1, each of the UEs 122 are installed with a Subscriber Identity Module (SIM) card 123. In one or more implementations, the SIM card 123 for each UE 122 contains data that confirms the subscription identity of the account holder associated with the UE 122. As such, the SIM card 123 allows the UE 122 to access services of the telecommunication network according to the account holder's account status. In most implementations, the core network 104 can utilize the information maintained by the SIM card 123 to verify identity and location of the UE 122 thereby allowing the UE 122 to make phone calls, send text messages, and use mobile data. The SIM card 123 can be a physical computer chip or can be programmatically integrated into the UE 122 rather than being a physical component.

As shown in FIG. 1, the UEs 122 may communicate with the core network 104 via the RAN 102. As mentioned above, one or more components of the environment 100 may be implemented within an architecture of a cellular network. For example, as noted above, a cellular network may include a radio access portion inclusive of a network of mobile towers (or base stations) in combination with components of a core network 104. Thus, as used herein, a cellular network may refer broadly to an architecture inclusive of the radio access network 102 including the mobile towers and computing nodes of the core network 104.

Each of the UEs 122, the RAN 102, and components of the core network 104 may communicate via one or more networks. These networks may include one or more communication platforms or any technology for transmitting data. For example, a network may include the Internet or other data link that enables transport of electronic data between the UEs 122, the RAN 102, and components of the core network 104. In one or more embodiments, some or all of the components of the core network 104 are implemented on a cloud computing system. In addition, one or more embodiments of the RAN components may be virtualized and/or otherwise implemented as part of a cloud computing system. In one or more embodiments, components of the RAN 102 and/or core network 104 may be implemented on an edge network that has virtual connections to the internal data center(s) (e.g., the data network 106) of the cloud computing system.

Figure 2:
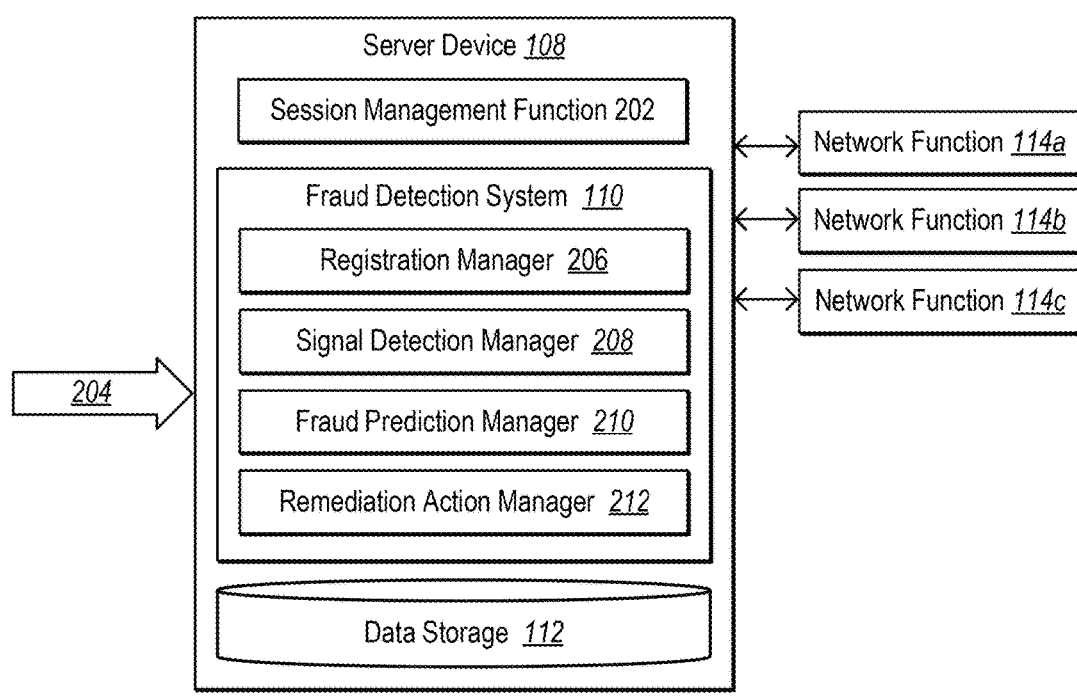
FIG. 2 illustrates the fraud detection system implemented on a server device in accordance with one or more embodiments.

FIG. 2 illustrates additional detail with regard to the server device 108 and the components thereon. For example, as mentioned above, the server device 108 can include the fraud detection system 110. As shown in FIG. 2, the fraud detection system 110 can include a registration manager 206, a signal detection manager 208, a fraud prediction manager 210, and a remediation action manager 212. In one or more implementations, as mentioned above, the server device 108 can also include a session management function 202 (e.g., an SMF). Additionally, the server device 108 includes the data storage 112.

In one or more implementations, the fraud detection system 110 is primarily responsible for creating, managing, and terminating data sessions within a telecommunications network. As such, the features and functionality of the session management function 202 may be distributed across multiple nodes within the core network 104. Moreover, the session management function 202 may work in concert with other functions such as the fraud detection system 110. Thus, in some implementations, some or all of the functionality of the session management function 202 may be co-located on the server device 108 with the fraud detection system 110. In additional implementations, the session management function 202 may be separately located from the fraud detection system 110 within the core network 104.

As shown in FIG. 2, the server device 108 may receive a request 204 to establish a network session. As used herein, the request 204 may include any request received from a UE 122 which includes information about a source device, destination device, and/or any information about the service and/or operation being requested. Moreover, the request 204 may further include SIM card data from the SIM card 123 of the UE 122.

As just mentioned, the fraud detection system 110 includes the registration manager 206. In one or more embodiments, the registration manager 206 handles tasks associated with registering a UE 122 within the core network 104. For example, the registration manager 206 can receive the request 204 from the UE 122 (e.g., via the session management function 202) including a unique identifier stored by the SIM card 123 on the UE 122. As mentioned above, the registration manager 206 can receive this information via the session management function 202 and/or one or more of the additional network functions 114a-114c (e.g., such as via the AUSF).

In response to receiving the unique identifier as part of the SIM card data, the registration manager 206 can work in connection with one or more of the additional network functions 114a-114c (e.g., the UDM and/or UDR) to retrieve an authentication key associated with the unique identifier. The registration manager 206 can further generate a random number and a first encryption of the random number utilizing the authentication key. The registration manager 206 also transmits the random number to the UE 122 as part of an authentication challenge.

In one or more embodiments, the UE 122 receives the random number from the registration manager 206 and generates a second encryption of the random number utilizing a unique key stored by the SIM card 123. The UE 122 then transmits the second encryption back to the registration manager 206 as an authentication response. By comparing the first encryption and the second encryption, the registration manager 206 can verify the identity of the UE 122 by determining that the first encryption and the second encryption match (i.e., indicating that the SIM card data on the SIM card 123 matches the data stored in the data storage 112 in association with the unique identifier for the SIM card 123). With the identity of the UE 122 verified, the registration manager 206 can register the UE 122 and establish the network session for the UE 122 such that the UE 122 can access services within the core network 104.

As mentioned above, the fraud detection system 110 includes the signal detection manager 208. In one or more embodiments, the signal detection manager 208 detects potential fraud signals from multiple sources. For example, the signal detection manager 208 can detect potential fraud signals from any of the network functions 114a-114c. To illustrate, the signal detection manager 208 can detect potential fraud signals from the network functions 114a-114c during registration of the UE 122 as discussed above. In one or more implementations, potential fraud signals detected from the network functions 114a-114c can include, but are not limited to, a roaming signal associated with the UE 122, a batch number associated with the SIM card 123, a registration location associated with the SIM card 123 (e.g., a geographic location of the SIM card 123 when the associated UE 122 was registered with the telecommunication network), and other network activity data associated with the UE 122.

In one or more implementations, the network activity data associated with the UE 122 can be strong indicators of fraudulent SIM card activity. For example, the network activity data detected by the signal detection manager 208 can include, but is not limited to, an amount of time that elapsed between registering the UE 122 and detected network activity associated with the UE 122, a duration of network activity associated with the UE 122, a current location of the network activity associated with the UE 122, and a time of day of the network activity associated with the UE 122.

As mentioned above, the fraud detection system 110 includes the fraud prediction manager 210. In one or more embodiments, the fraud prediction manager 210 applies one or more machine learning models to the potential fraud signals detected by the signal detection manager 208 to generate fraud predictions associated with the SIM card 123 of the UE 122. For example, the fraud prediction manager 210 can generate input vectors for the one or more machine learning models including combinations of the potential fraud signals. To illustrate, in some implementations, fraud prediction manager 210 generates an input vector including a combination of signals that are most likely to predict fraudulent behavior (e.g., a subset of the total number of potential fraud signals). In other implementations, the fraud prediction manager 210 generates an input vector including all of the potential fraud signals detected by the signal detection manager 208. In yet other implementations, the fraud prediction manager 210 can apply weights to a subset of potential fraud signals that are most indicative of fraudulent activity and then generate an input vector including all of the detected potential fraud signals including the weighted subset.

In one or more implementations, the fraud prediction manager 210 further applies one or more machine learning models to the generated input vector to generate a fraud prediction. For example, in some implementations, the fraud prediction manager 210 utilizes any type of machine learning model that is trained on historical data to predict future outcomes—specifically, whether a particular SIM card is engaging in fraudulent activity. To illustrate, the fraud prediction manager 210 can utilize classification models (e.g., decision trees, support vector machines, k-nearest neighbors) to predict whether the SIM card 123 belongs in a fraudulent class of SIM cards. In another example, the fraud prediction manager 210 can utilize a regression model to predict a numerical value representing a predictive likelihood that the SIM card 123 is engaging in fraudulent activity. In yet another example, the fraud prediction manager 210 can utilize an anomaly detection model to identify unusual or unexpected patterns in the potential fraud signals associated with the SIM card 123 to predict whether the SIM card 123 is engaged in fraudulent activity. In additional implementations, the fraud prediction manager 210 can leverage a combination of these or other types of machine learning models to generate the fraud prediction associated with the SIM card 123.

In at least one embodiment, the fraud prediction manager 210 trains and maintains the one or more machine learning models. For example, the fraud prediction manager 210 can generate ground-truth training data including training combinations of potential fraud signals and ground-truth fraud predictions associated with those training combinations. The fraud prediction manager 210 can apply the one or more machine learning models to the training combinations of potential fraud signals to generate training fraud predictions. The fraud prediction manager 210 then compares the training fraud predictions to the corresponding ground-truth fraud predictions, and back-propagates the results of those comparisons through the machine learning models. The fraud prediction manager 210 repeats this training cycle over multiple epochs until the loss from one training cycle to the next is minimized.

Additionally, the fraud prediction manager 210 can maintain the one or more machine learning models in various ways. For example, in some implementations, the fraud prediction manager 210 maintains the one or more machine learning models within the data storage 112 on the server device 108. In an additional implementation, the fraud prediction manager 210 maintains the one or more machine learning models on a separate node within the core network 104 (e.g., a cloud-based server device). In that implementation, the fraud prediction manager 210 can transmit the combination of potential fraud signals associated with the SIM card 123 to the cloud-based server device. Alternatively, the fraud prediction manager 210 can generate the input vector from the combination of potential fraud signals and transmit the generated input vector to the cloud-based server device. The machine learning models can then transmit the generated fraud prediction from the cloud-based server device back to the fraud prediction manager 210 on the server device 108.

In one or more embodiments, the fraud prediction manager 210 generates the one or more machine learning models to share anonymized information with and receive anonymized information from other instances of the fraud detection system 110. For example, data from multiple networks and multiple service providers may be used by multiple instances of the fraud detection system 110. By sharing this information anonymously among instances of the fraud detection system 110, the one or more machine learning models can increase the accuracy of their fraud predictions. To illustrate, an instance of the fraud detection system 110 may predict fraudulent activity in a SIM card from Batch A. By sharing this information with a second instance of the fraud detection system 110, that second instance of the fraud detection system 110 may predict that fraud in connection with another SIM card from that same batch is more likely.

As mentioned above, the fraud detection system 110 includes the remediation action manager 212. In one or more embodiments, the remediation action manager 212 executes one or more remediation actions based on the fraud prediction generated by the fraud prediction manager 210. For example, the remediation action manager 212 can execute remediation actions including, but not limited to, generating and transmitting a fraud alert associated with the UE 122, adding the UE 122 to a fraud watchlist, and blocking the UE 122 from accessing the telecommunication network.

In one or more examples, the remediation action manager 212 can execute a particular remediation action based on a severity indicated by the fraud prediction. To illustrate, the remediation action manager 212 can execute a lighter remediation action such as adding the UE 122 to a fraud watchlist if the fraud prediction indicates that the UE 122 may be engaging in fraudulent SIM card activity. The remediation action manager 212 can also execute a more severe remediation action such as blocking the UE 122 from accessing the telecommunication network in response to the fraud prediction indicating that it is highly likely that the UE 122 is engaging in fraudulent SIM card activity.

Furthermore, as shown in FIG. 2, the server device 108 includes the data storage 112. In one or more implementations, the data storage 112 stores detected potential fraud signals associated with the UEs 122 and the SIM cards 123 installed thereon. In some implementations, the data storage 112 also stores one or more machine learning models that generate fraud predictions based on the potential fraud signals.

Figure 3A:
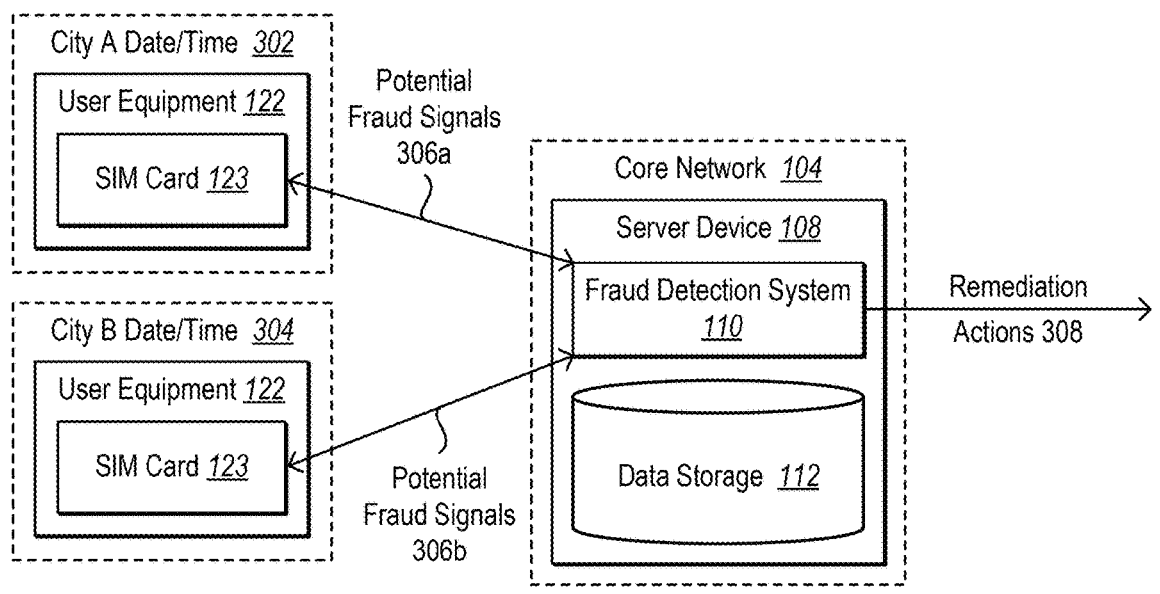
FIGS. 3A and 3B illustrate scenarios where the fraud detection system predicts fraudulent activity based on potential fraud signals detected while a user equipment is roaming in accordance with one or more embodiments.
Figure 3B:
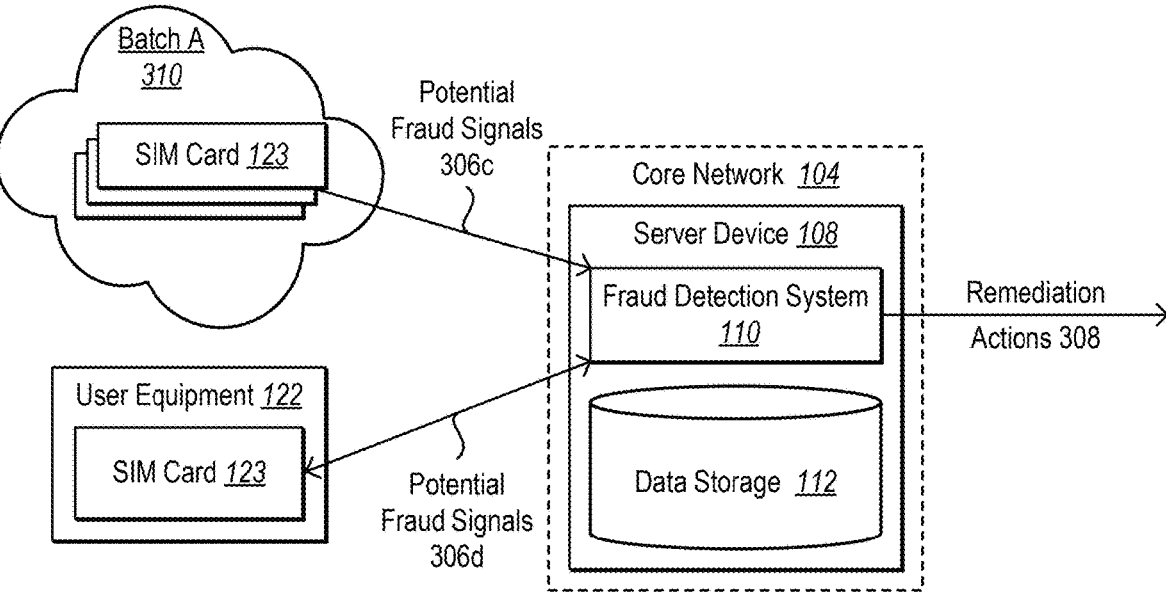

As discussed above, the fraud detection system 110 detects potential fraud signals associated with a SIM card 123 of a UE 122 to predict whether that SIM card 123 is being used in connection with fraudulent activity. This type of fraudulent activity is often enacted when the UE 122 is roaming in a network that is outside of the telecommunication network associated with the SIM card 123. FIGS. 3A and 3B illustrate some scenarios where the fraud detection system 110 predicts fraudulent activity based on potential fraud signals detected while the UE 122 is roaming.

For example, as shown in FIG. 3A, the fraud detection system 110 can detect potential fraud signals 306a in connection with the SIM card 123 of the UE 122 while the UE

122 is located in "City A" at a first date and time (302). To illustrate, the fraud detection system 110 can access data from any of the network functions 114a-114c (e.g., the AUSF, the UDM, the UDR) to determine that the UE 122 came online and registered with the core network 104 of the telecommunication network at the first date and time while it was physically located in "City A."

In one or more implementations, the fraud detection system 110 can detect additional potential fraud signals in connection with the SIM card 123 of the UE 122 over time. For example, as illustrated in FIG. 3A, the fraud detection system 110 can detect additional potential fraud signals 306b at a second date and time (304). In one or more embodiments, the fraud detection system 110 can detect the additional potential fraud signals 306b indicating that the UE 122 is now roaming in "City B" at the second date and time (304). In this example, the fraud detection system 110 can determine from the potential fraud signals 306a, 306b that "City A" and "City B" are 1000 miles apart, while the amount of time that has elapsed between the first date and time (302) and the second date and time (304) is only ten minutes.

In one or more embodiments, the fraud detection system 110 generates an input vector reflecting this information and applies one or more machine learning models to the input vector to generate a fraud prediction. As discussed above, the fraud detection system 110 can generate the fraud prediction as a binary classification (e.g., 1 representing fraud is predicted, 0 representing fraud is not predicted). Additionally, the fraud detection system 110 can generate the fraud prediction as a non-binary classification that indicates whether fraud is predicted as well as the type of fraud. For example, the fraud detection system 110 can generate a fraud prediction for the scenario illustrated in FIG. 3A indicating that fraud is predicted and that the SIM card 123 was likely cloned in "City A" and then used fraudulently in "City B" due to the short amount of elapsed time between the first date and time (302) and the second date and time (304).

In response to the generated fraud prediction indicating fraud is predicted in connection with the SIM card 123, the fraud detection system 110 can execute one or more remediation actions 308. As discussed above, the fraud detection system 110 can execute any of a range of one or more remediation actions 308 based on the fraud prediction. For example, the fraud detection system 110 can block the UE 122 from accessing the telecommunication network if the predicted fraud meets a predetermined level of severity. In another example, the fraud detection system 110 can add the SIM card 123 to a fraud watch list, or can generate and transmit a communication to the account holder associated with the SIM card 123 to warn of the predicted fraudulent activity.

In another example illustrated in FIG. 3B, the fraud detection system 110 detects potential fraud signals 306c in connection with a "Batch A" 310 of SIM cards including the SIM card 123. For example, the fraud detection system 110 can detect potential fraud signals from the SIM cards in the "Batch A" 310 indicating that they are all part of the same manufacturing batch. Over time, the fraud detection system 110 can monitor and track fraud predictions associated with any of the SIM cards in the "Batch A" 310.

As such, in at least one implementation, the fraud detection system 110 can further detect potential fraud signals 306d at a later time when the SIM card 123 from the "Batch A" 310 is installed and utilized on the UE 122. The fraud detection system 110 can detect that the SIM card 123 is from "Batch A" 310 from the information included in the potential fraud signals 306*d*. In this example, the fraud detection system 110 can generate an input vector from either or both of the potential fraud signals 306*c*, 306*d* and apply the one or more machine learning models to the input vector to generate a fraud prediction.

As with the example illustrated in FIG. 3A, the fraud detection system 110 can generate a fraud prediction in connection with the example illustrated in FIG. 3B that indicates whether fraud is predicted. The fraud detection system 110 can further generate the fraud prediction to indicate the reason why the fraud is predicted. For example, the fraud detection system 110 can generate the fraud prediction indicating that fraud is predicted because every other SIM card from "Batch A" 310 has been predicted to be engaged in fraudulent activity-thereby indicating that "Batch A" 310 was likely purchased by the same bad actor. Following generation of the fraud prediction, the fraud detection system 110 can execute one or more remediation action 308 as discussed above.

In additional implementations, the fraud detection system 110 can predict fraudulent activity based solely on a SIM card coming from a batch that engages in or is otherwise associated with fraudulent activity. For example, if SIM cards A, B, and C come from the same batch and are all shown to have engaged in fraudulent activity, the fraud detection system 110 may predict that SIM card D from the same batch will also be fraudulent-even though SIM card D may not be associated with any other potential fraud signals.

In additional examples beyond those illustrated in FIGS. 3A and 3B, the fraud detection system 110 makes fraud predictions based on a level of network activity associated with the UE 122. For example, the fraud detection system 110 can detect that the UE 122 has engaged in little to no network activity while it is located within the telecommunication network's coverage area, but then engages in a high amount of network activity as soon as the UE 122 roams outside of that coverage area. Similarly, the fraud detection system 110 may predict fraudulent activity in response to detecting that the UE 122 engages in high amounts of network activity for short bursts of time (e.g., short durations of time) while the UE 122 is roaming.

While not explicitly shown in FIGS. 3A-3B, in one or more embodiments, the fraud detection system 110 considers observed latency measurements associated with a communication in determining instances of fraud. For example, in addition or as an alternative to detecting potential fraud signals associated with a particular SIM card (or batch of SIM cards), the fraud detection system 110 may further analyze latency measurements that are collected or otherwise observed in connection with one or more communications.

As an example, in one or more implementations, a user plane function (UPF) may detect and/or log latency measurements of different communications and provide the measurements to the fraud detection system 110 on the associated server device. The fraud detection system 110 may analyze these instances of latency and determine that an abnormal amount of latency exists for certain SIM cards or for certain communication sessions than would otherwise be expected.

As an illustrative example, where session information for a voice call indicates that the voice call is allegedly originating from a city in the United Kingdom (UK) and going to a destination device also in the UK, the call would be expected to have a latency between 10-20 milliseconds. In this example, however, the information logged by the UPF and provided to the fraud detection system 110 may indicate a latency of over one hundred milliseconds (e.g., 150 milliseconds) rather than the expected 10-20 milliseconds. Based on this, the fraud detection system 110 may determine an instance of fraud or simply determine a higher likelihood of fraud associated with the SIM card or identity of a device associated with the higher latency communications.

This example may similarly work in an alternative fashion. For example, where session information of a communication indicates that a voice call is originating from a city in a first country and arriving at a city in a second country where the two countries are considerable distances away, the fraud detection system 110 would likely expect that a latency of the communications be higher than a scenario where the voice call is being communicated between two devices that are closer to one another. In this example, where the call is originating from a different country or some location associated with a predicted higher latency, if the latency information logged by the UPF and provided to the fraud detection system 110 indicates a lower latency than expected, the fraud detection system 110 may also determine an instance of fraud or determine a higher likelihood of fraud associated with the SIM card or identify of the device associated with the lower latency communication.

Indeed, the fraud detection system 110 may detect instances of fraud based at least in part on any discrepancies detected between an expected latency and an unexpected observed latency. In one or more embodiments, the fraud detection system 110 may elevate the risk or prediction of fraud based on the difference between an expected latency measurement and an observed latency measurement (as observed by a UPF). More specifically, the fraud detection system 110 may determine an instance of fraud where the difference between expected and observed latency is greater than some determined threshold (e.g., a threshold time difference, threshold percentage difference). In one or more embodiments, this threshold is configurable and may be modified or altered to have a corresponding level of sensitivity to instances of fraud.

It will be noted that this latency-based detection of fraud may be considered in combination with any of the above signals associated with SIM card characteristics and SIM card batch characteristics. Indeed, in one or more embodiments, the fraud detection system 110 may detect instances of fraud based on a combination of subscriber data management (SDM) network function related information, or any network function related information in combination with the latency (or other timing) information gathered and provided by the UDF(s) to the fraud detection system 110.

Figure 4:
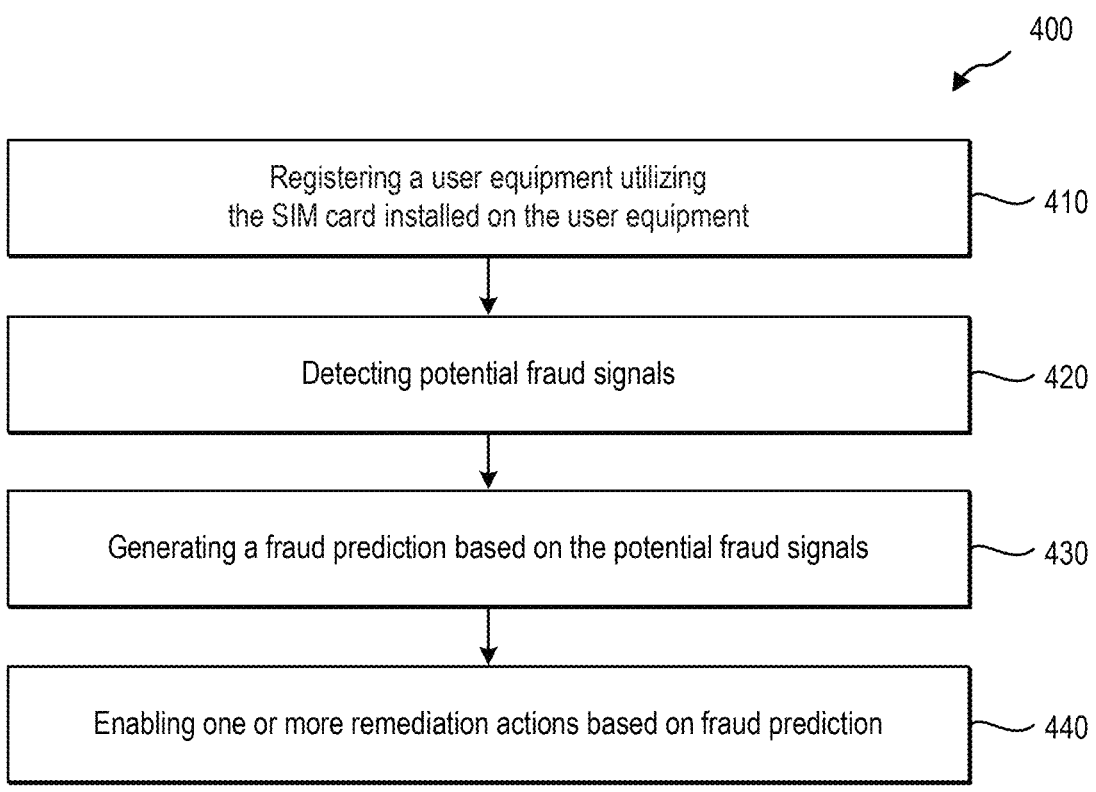
FIG. 4 illustrates an example series of acts for detecting fraudulent activity in connection with a roaming SIM card in accordance with one or more embodiments.

Turning now to FIG. 4, this figure illustrates an example flowchart including a series of acts featuring the fraud detection system 110 utilizing potential fraud signals to predict fraudulent activity associated with a SIM card 123 and remediate that fraudulent activity. While FIG. 4 illustrates acts according to one or more embodiments, alternative embodiments may omit, add to, reorder, and/or modify any of the acts shown in FIG. 4. The acts of FIG. 4 can be performed as part of a method. Alternatively, a non-transitory computer-readable medium can include instructions that, when executed by one or more processors, cause a computing device to perform the acts of FIG. 4. In still further embodiments, a system can perform the acts of FIG. 4.

FIG. 4 illustrates an example series of acts 400 related to predicting fraudulent SIM card activity. As shown in FIG. 4, the series of acts 400 includes an act 410 of registering a user equipment utilizing the SIM card installed on the user equipment. In one or more embodiments, the act 410 includes registering a user equipment with the telecommunication network based on one or more interactions with the SIM card installed on the user equipment.

For example, as discussed above, the fraud detection system 110 can receive a communication from the user equipment including a unique identifier stored on the SIM card installed thereon. The fraud detection system 110 can then retrieve an authentication key associated with the unique identifier, generate a random number and a first encryption of the random number utilizing the authentication key, and transmit the random number to the user equipment. The user equipment then generates a second encryption of the random number and transmits the second encryption back to the fraud detection system 110. The fraud detection system 110 can then register the user equipment based on the first encryption matching the second encryption.

As further shown in FIG. 4, the series of acts 400 includes an act 420 of detecting potential fraud signals. In one or more embodiments, the act 420 includes detecting a combination of potential fraud signals associated with the SIM card. For example, detecting the combination of potential fraudulent signals associated with the SIM card may be based on subscriber data received from one or more subscriber data management functions, the subscriber data being obtained when registering the user equipment with the telecommunication network. This subscriber data may be received from one or more of the AUSF, the UDM, or the UDR. Additionally, the subscriber data may be received from any of the network functions 114a-114c (e.g., a policy control function, a charging function, or any other network function).

Furthermore, detecting the combination of potential fraud signals associated with the SIM card can include detecting any two or more of a roaming signal associated with the user equipment, a batch number associated with the SIM card, a registration location associated with the SIM card, and network activity data associated with the user equipment. Such network activity data associated with the user equipment can include: an amount of time that elapsed between registering the user equipment and detected network activity associated with the user equipment, a duration of network activity associated with the user equipment, a current location of the network activity associated with the user equipment, and/or a time of day of the network activity associated with the user equipment.

As further shown in FIG. 4, the series of acts 400 includes an act 430 of generating a fraud prediction based on the potential fraud signals. In one or more embodiments, the act 430 includes generating a fraud prediction associated with the SIM card by applying one or more machine learning models to the combination of potential fraud signals. For example, in some embodiments, generating the fraud prediction can include transmitting the combination of potential fraud signals to a cloud-based server device storing the one or more machine learning models and receiving the fraud prediction from the cloud-based server device.

As further shown in FIG. 4, the series of acts 400 includes an act 440 of enabling one or more remediation actions based on the fraud prediction. In one or more embodiments, the act 440 includes executing one or more remediation actions associated with the user equipment based on the fraud prediction. For example, executing the one or more remediation actions associated with the user equipment based on the fraud prediction can include one or more of: generating and transmitting a fraud alert associated with the user equipment, adding the user equipment to a fraud watchlist, and blocking the user equipment from accessing the telecommunication network.

Figure 5:
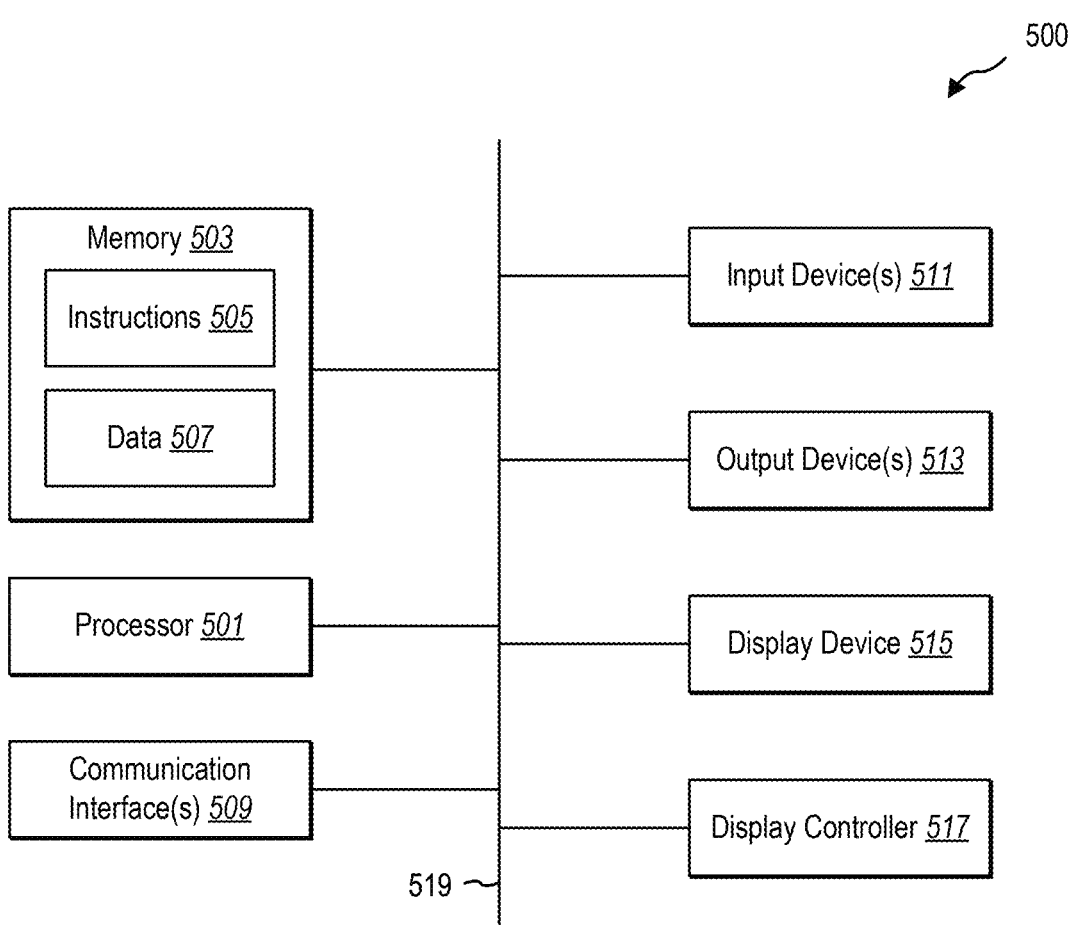
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a telecommunication network including one or more subscriber data management functions, a method for detecting fraudulent subscriber identity module (SIM) card usage comprising:

registering a user equipment with the telecommunication network based on one or more interactions with a SIM card installed on the user equipment;

receiving, from a user plane function (UPF) implemented on the telecommunication network, latency data collected by the UPF for communications associated with the user equipment;

detecting a combination of potential fraud signals associated with the SIM card based on a combination of subscriber data received from one or more subscriber data management functions and the latency data collected by the UPF, wherein the subscriber data is obtained when registering the user equipment with the telecommunication network;

applying one or more machine learning models to the combination of potential fraud signals to generate a fraud prediction associated with the SIM card, the fraud prediction being based at least in part on an observed latency from the latency data exceeding an expected latency for the user equipment by a threshold amount, the expected latency being based on the subscriber data; and executing one or more remediation actions associated with the user equipment based on the fraud prediction.

2. The method as recited in claim 1, wherein registering the user equipment with the telecommunication network based on the one or more interactions with the SIM card installed on the user equipment comprises:

receiving a communication from the user equipment comprising a unique identifier stored on the SIM card;

retrieving an authentication key associated with the unique identifier;

generating a random number and a first encryption of the random number utilizing the authentication key;

transmitting the random number to the user equipment;

receiving a second encryption of the random number from the user equipment; and registering the user equipment based on the first encryption matching the second encryption.

3. The method as recited in claim 1, wherein the subscriber data is received from the one or more subscriber data management functions including one or more of:

an authentication server function (AUSF);

a unified data management (UDM) function; and a user data repository (UDR) function.

4. The method as recited in claim 1, wherein detecting the combination of potential fraud signals associated with the SIM card comprises detecting two or more of:

a roaming signal associated with the user equipment;

a batch number associated with the SIM card;

a registration location associated with the SIM card; and network activity data associated with the user equipment.

5. The method as recited in claim 4, wherein the network activity data associated with the user equipment comprises one or more of:

an amount of time that elapsed between registering the user equipment and detected network activity associated with the user equipment;

a duration of network activity associated with the user equipment;

a current location of the network activity associated with the user equipment; and a time of day of the network activity associated with the user equipment.

6. The method as recited in claim 1, wherein applying the one or more machine learning models to the combination of potential fraud signals comprises:

transmitting the combination of potential fraud signals to a cloud-based server device storing the one or more machine learning models; and receiving the fraud prediction from the cloud-based server device.

7. The method as recited in claim 1, wherein executing the one or more remediation actions associated with the user equipment based on the fraud prediction comprises one or more of:

generating and transmitting a fraud alert associated with the user equipment;

adding the user equipment to a fraud watchlist; and blocking the user equipment from accessing the telecommunication network.

8. The method as recited in claim 1, wherein the telecommunication network comprises a fifth generation (5G) mobile communication network.

9. A system comprising:

at least one processor:

memory in electronic communication with the at least one processor; and instructions stored in the memory, the instructions being executable by the at least one processor to:

register a user equipment with a telecommunication network based on one or more interactions with a subscriber identity module (SIM) card installed on the user equipment;

receive, from a user plane function (UPF) implemented on the telecommunication network, latency data collected by the UPF for communications associated with the user equipment;

detect a combination of potential fraud signals associated with the SIM card based on a combination of subscriber data received from one or more subscriber data management functions and latency data collected by the UPF, wherein the subscriber data is obtained when registering the user equipment with the telecommunication network;

applying one or more machine learning models to the combination of potential fraud signals to generate a fraud prediction associated with the SIM card, the fraud prediction being based at least in part on an observed latency from the latency data exceeding an expected latency for the user equipment by a threshold amount, the expected latency being based on the subscriber data; and execute one or more remediation actions associated with the user equipment based on the fraud prediction.

10. The system as recited in claim 9, wherein the instructions stored in the memory are further executable by the at least one processor to register the user equipment with the telecommunication network based on the one or more interactions with the SIM card installed on the user equipment by:

receiving a communication from the user equipment comprising a unique identifier stored on the SIM card;

retrieving an authentication key associated with the unique identifier;

generating a random number and a first encryption of the random number utilizing the authentication key;

transmitting the random number to the user equipment;

receiving a second encryption of the random number from the user equipment; and registering the user equipment based on the first encryption matching the second encryption.

11. The system as recited in claim 9, wherein the subscriber data is received from the one or more subscriber data management functions including one or more of:

an authentication server function (AUSF);

a unified data management (UDM) function; or a user data repository (UDR) function.

12. The system as recited in claim 9, wherein the instructions stored in the memory are further executable by the at least one processor to detect the combination of potential fraudulent signals associated with the SIM card by detecting any two or more of:

a roaming signal associated with the user equipment;

a batch number associated with the SIM card;

a registration location associated with the SIM card; and network activity data associated with the user equipment.

13. The system as recited in claim 12, wherein the network activity data associated with the user equipment comprises one or more of:

an amount of time that elapsed between registering the user equipment and detected network activity associated with the user equipment;

a duration of network activity associated with the user equipment;

a current location of the network activity associated with the user equipment; and a time of day of the network activity associated with the user equipment.

14. The system as recited in claim 9, wherein applying one or more machine learning models to the combination of potential fraud signals to generate the fraud prediction associated with the SIM card further comprises:

transmitting the combination of potential fraud signals to a cloud-based server device storing the one or more machine learning models; and receiving the fraud prediction from the cloud-based server device.

15. The system as recited in claim 9, wherein the instructions stored in the memory are further executable by the at least one processor to execute the one or more remediation actions associated with the user equipment based on the fraud prediction by performing one or more of:

generating and transmitting a fraud alert associated with the user equipment;

adding the user equipment to a fraud watchlist; and blocking the user equipment from accessing the telecommunication network.

16. The system as recited in claim 9, wherein the telecommunication network comprises a fifth generation (5G) mobile communication network.

17. In a fifth generation (5G) mobile communication network including one or more subscriber data management functions, a method for detecting fraudulent subscriber identity module (SIM) card usage comprising:

registering a user equipment with the 5G mobile communication network based on one or more interactions with a SIM card installed on the user equipment;

receiving, from a user plane function (UPF) implemented on the 5G mobile communication network, latency data collected by the UPF for communications associated with the user equipment;

detecting a combination of potential fraud signals associated with the SIM card based on a combination of subscriber data received from one or more subscriber data management functions and the latency data collected by the UPF, wherein the subscriber data is being obtained when registering the user equipment with the 5G mobile communication network;

applying one or more machine learning models to the combination of potential fraud signals to generate a fraud prediction associated with the SIM card, the fraud prediction being based at least in part on an observed latency from the latency data exceeding an expected latency for the user equipment by a threshold amount, the expected latency being based on the subscriber data; and generating and transmitting a fraud alert associated with the user equipment based on the fraud prediction.

18. The method as recited in claim 17, wherein the subscriber data is received from at least one of:

an authentication server function (AUSF);

a unified data management (UDM) function; or a user data repository (UDR) function.

19. The method as recited in claim 17, wherein detecting the combination of potential fraud signals associated with the SIM card comprises detecting two or more of:

a roaming signal associated with the user equipment;

a batch number associated with the SIM card;

a registration location associated with the SIM card; and network activity data associated with the user equipment.

\* \* \* \* \*